(12) United States Patent
Lin

(10) Patent No.: US 7,600,069 B2
(45) Date of Patent: Oct. 6, 2009

(54) MULTI-INTERFACE CONVERSION DEVICE

(75) Inventor: Sheng-yuan Lin, Taipei (TW)

(73) Assignee: Genesys Logic, Inc., Taipei (TW)

( * ) Notice: Subject to any disclaimer, the term of this patent is extended or adjusted under 35 U.S.C. 154(b) by 274 days.

(21) Appl. No.: 11/761,172

(22) Filed: Jun. 11, 2007

(65) Prior Publication Data

US 2007/0300006 A1   Dec. 27, 2007

(30) Foreign Application Priority Data

Jun. 23, 2006   (TW) ............................ 95210985 U

(51) Int. Cl.
G06F 13/36   (2006.01)
H01R 25/00   (2006.01)
G06F 13/14   (2006.01)

(52) U.S. Cl. ................... 710/315; 710/305; 710/307; 710/314; 439/638

(58) Field of Classification Search ............... 710/315
See application file for complete search history.

(56) References Cited

U.S. PATENT DOCUMENTS

| 7,010,638 | B2 * | 3/2006 | Deng et al. | 710/306 |
| 7,297,017 | B2 * | 11/2007 | Chien | 439/476.1 |
| 7,393,247 | B1 * | 7/2008 | Yu et al. | 439/638 |
| 2007/0197100 | A1 * | 8/2007 | Tsao | 439/638 |
| 2007/0294455 | A1 * | 12/2007 | Buxton et al. | 710/307 |
| 2007/0294459 | A1 * | 12/2007 | Chen | 710/315 |
| 2008/0288703 | A1 * | 11/2008 | Iyer | 710/305 |
| 2008/0288782 | A1 * | 11/2008 | Iyer | 713/186 |

FOREIGN PATENT DOCUMENTS

| TW | 272209 | 8/2005 |
| TW | 290602 | 5/2006 |

OTHER PUBLICATIONS

Oxford Semiconductor OXUF924DSA/B Documents; 2005, 9 pages.*
Genesys Logic Inc.—GL830—USB 2.0/PATA/SATA Bridge Controller; Datasheet Revision 1.14: Dec. 30, 2008, 37 pages.*

(Continued)

Primary Examiner—Mark Rinehart
Assistant Examiner—Brian T Misiura

(57) ABSTRACT

A multi-interface conversion device includes a USB-to-IDE interface bridging unit, an IDE-to-SATA interface bridging unit, an IDE switching unit, and a switching logic unit. The USB-to-IDE interface bridging unit provides USB to IDE bridging and conversion. The IDE-to-SATA interface bridging unit provides IDE to SATA interface conversion or IDE to eSATA interface conversion or SATA to eSATA interface conversion. The IDE-to-SATA interface bridging unit is connected to the USB-to-IDE interface bridging unit to transmit USB-to-IDE converted data to the IDE-to-SATA interface bridging unit to provide conversion between USB interface and SATA. The IDE switching unit is connected to the USB-to-IDE interface bridging unit and the IDE-to-SATA interface bridging unit for switching the output IDE interface and signal between the USB-to-IDE interface bridging unit and the IDE-to-SATA interface bridging unit. The switching logic unit is connected to the IDE switching unit and the IDE-to-SATA interface bridging unit to control the switching the conversion among all interfaces.

9 Claims, 6 Drawing Sheets

OTHER PUBLICATIONS

Sohousb—Magic Bridge Dual Interfaces Storage Bridge; No Date Provided, 1 page.*

Sohousb—HAC-882JM—Magic Bridge II Dual Interfaces Storage Bridge; No Date Provided, 1 page.*

USB 2.0 Transceiver Macrocell Interface (UTMI) Specification; Mar. 29, 2001; 67 pages.*

Amazon.com: "Sabrent USB-DSC5 Serial ATA or IDE 2.5/3.5-Inch to USB 2.0 Cable Converter Adapter with Power Supply", Dated May 10, 2009; 3 pages.*

* cited by examiner

MULTI-INTERFACE CONVERSION DEVICE

BACKGROUND OF THE INVENTION

1. Field of the Invention

The present invention generally relates to a multi-interface conversion device, and in particular to a conversion device that is applicable in connection between electronic devices of different interface and for conversion and control of switching among different interfaces, including USB, IDE, SATA, and eSATA.

2. The Related Arts

Various interfaces, such as USB, IDE, SATA (Serial Advanced Technology Attachment), and eSATA, are widely used in electronic equipments and devices, such as portable disk drives, hard disk drives, optic disk drives, notebook computers and desktop computers, and personal digital assistants, to serve as input/output interfaces of data and signals. These known interfaces, however, are not compatible with each other in practical applications, so that connection and conversion among theses interfaces are not available. Thus, all these interfaces must be connected to an intermediate medium, such as a computer, for conversion of data and interfacing for further input/output and storage of the data. Apparently, obstacles exist between electronic device equipped with different interfaces in doing data transfer and related applications.

Solutions to the above problems are available in the market. For example, conversion devices for conversion between USB and SATA or that between IDE and SATA are known. However, such conversion devices only work between two specific interfaces, and are not able to address the problem of data conversion or transfer among all the commonly used interfaces, including USB, IDE, SATA and eSATA, in which case, a computer is still needed to serve as an intermediate medium for data transfer or conversion among these commonly used interfaces.

Simple conversion between two specific interfaces, such as between USB and SATA and between IDE and SATA, is known from prior art references, such as Taiwan Utility Model Publication No. M272209. The technology disclosed in the reference, as discussed above, is not applicable to conversion or transfer of data between or among any arbitrary ones of the commonly used interfaces.

Further, Taiwan Utility Model Publication No. M290602 discloses connection and conversion between USB and eSATA, which similarly cannot solve the problem of connection and conversion among various interfaces.

SUMMARY OF THE INVENTION

Thus, the primary object of the present invention is to provide a multi-interface conversion device, comprising a USB-to-IDE interface bridging unit and an IDE-to-SATA interface bridging unit, wherein the USB-to-IDE interface bridging is used to do connection and conversion between USB and IDE interfaces, and the IDE-to-SATA interface bridging unit is used to do connection and conversion between IDE and SATA interfaces or between IDE and eSATA interfaces, or between SATA and eSATA interfaces to realize conversion and connection among a plurality of interfaces including USB, IDE, SATA, and eSATA interfaces.

The secondary object of the present invention is to provide a multi-interface conversion device, comprising an IDE switching unit and a switching logic unit, wherein the IDE switching unit is connected to the IDE-to-SATA interface bridging unit and the switching logic unit is connected to the IDE switching unit and the IDE-to-SATA interface bridging unit to control switching among all interfaces and thus realizing automatic switching and conversion connection among a number of interfaces.

To realize the above object, in accordance with the present invention, a multi-interface conversion device comprises a USB-to-IDE interface bridging unit, an IDE-to-SATA interface bridging unit, an IDE switching unit, and a switching logic unit. The USB-to-IDE interface bridging unit provides USB to IDE bridging and conversion. The IDE-to-SATA interface bridging unit provides IDE to SATA interface conversion or IDE to eSATA interface conversion or SATA to eSATA interface conversion. The IDE-to-SATA interface bridging unit is connected to the USB-to-IDE interface bridging unit to transmit USB-to-IDE converted data to the IDE-to-SATA interface bridging unit to provide conversion between USB interface and SATA or eSATA interface. The IDE switching unit is connected to the USB-to-IDE interface bridging unit and the IDE-to-SATA interface bridging unit for switching the output IDE interface and signal between the USB-to-IDE interface bridging unit and the IDE-to-SATA interface bridging unit. The switching logic unit is connected to the IDE switching unit and the IDE-to-SATA interface bridging unit to control the switching the conversion among all interfaces.

BRIEF DESCRIPTION OF THE DRAWINGS

In order to clearly show and make better comprehension of these and other features and advantages of the present invention, the present invention will now be described by way of examples, with reference to preferred embodiments illustrated in the drawings, in which.

DETAILED DESCRIPTION OF THE PREFERRED EMBODIMENTS

Figure 1:
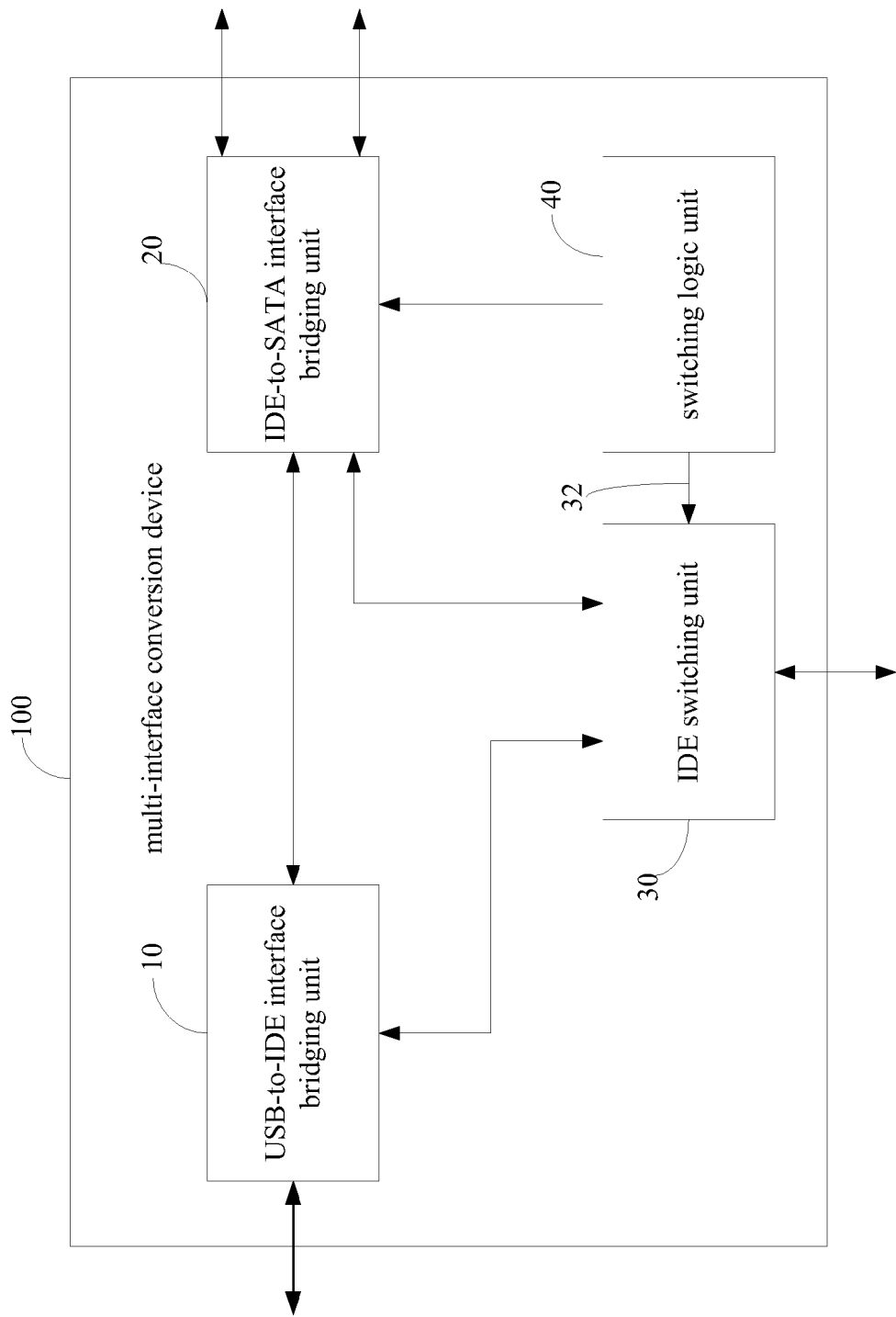
FIG. 1 shows a circuit block diagram of a multi-interface conversion device constructed in accordance with a first embodiment of the present invention.

Referring to FIG. 1, which shows a multi-interface conversion device constructed in accordance with a first embodiment of the present invention, generally designated with reference numeral 100, the multi-interface conversion device 100 comprises a USB-to-IDE interface bridging unit 10, an IDE-to-SATA interface bridging unit 20, an IDE switching unit 30, and a switching logic unit 40. The USB-to-IDE interface bridging unit 10 provides the function of bi-directional conversion and connection between USB and IDE interfaces. The USB-to-IDE interface bridging unit 10 can be of any type, such as a single chip or a circuit unit.

Figure 2:
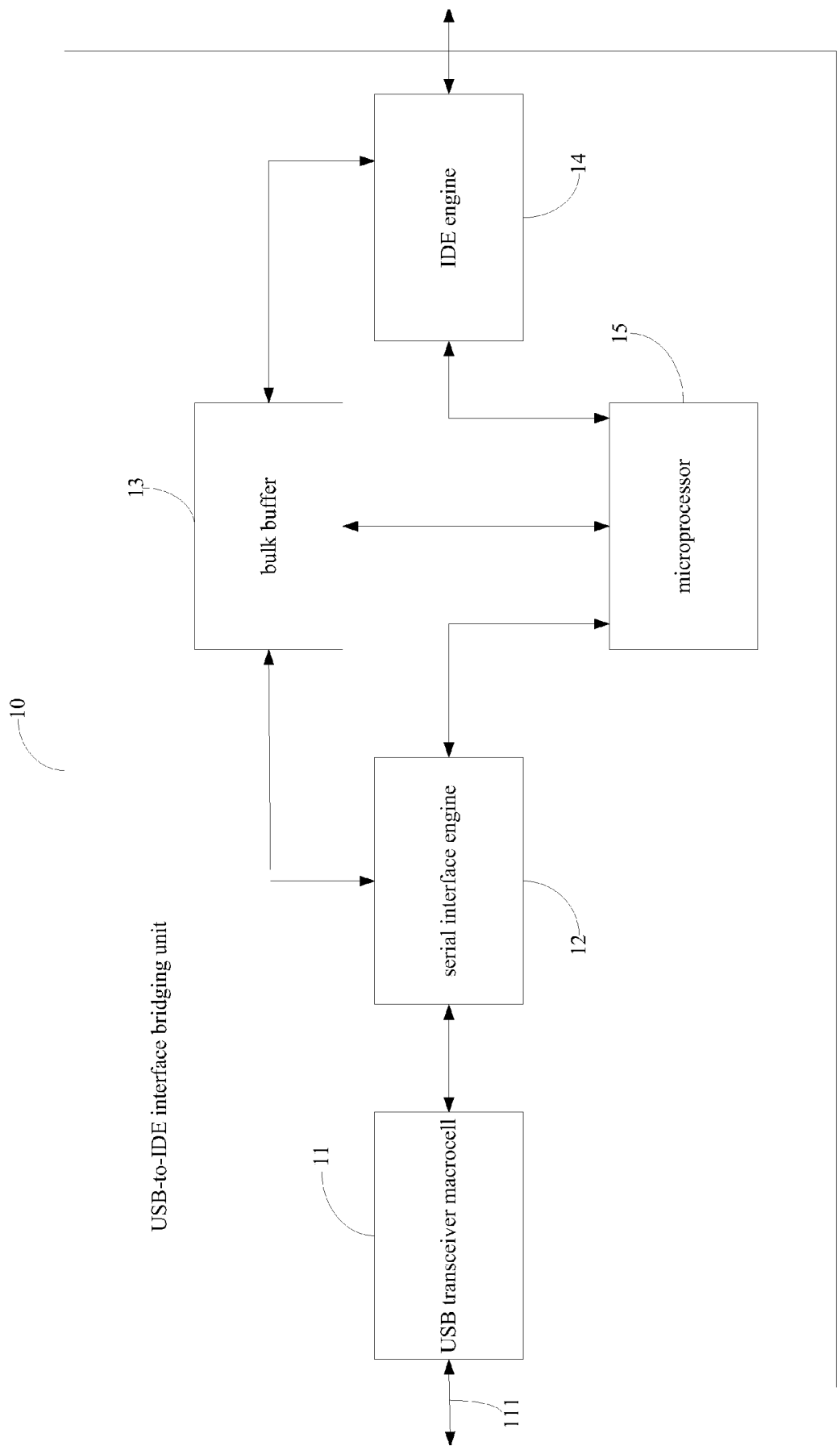
FIG. 2 shows a circuit block diagram of a USB-to-IDE interface bridging unit of the multi-interface conversion device of the present invention.

Also referring to FIG. 2, which shows an example of the USB-to-IDE interface bridging unit 10, the USB-to-IDE interface bridging unit 10 comprises a USB transceiver macrocell (UTM) 11, a serial interface engine (SIE) 12, a bulk buffer 13, an IDE engine 14, and a microprocessor 15. The UTM 11 has a USB connection terminal 111 for connection with a USB interfaced device, serving to receive and transmit a USB signal, and is compatible with USB1.1 FULL SPEED and USB2.0 HIGH SPEED.

The SIE 12 is connected to the UTM 11, serving to process and output USB data, signals, and packets. The bulk buffer 13 is connected to the SIE 12 to provide buffering for bi-directional data transmission between USB and IDE interfaces.

The IDE engine 14 is connected to the bulk buffer 13. The IDE engine 14 provides two modes of data conversion, including a direct memory access (DMA) mode and an ultra DMA mode, to serve as a data output port for connection with an IDE interface.

The microprocessor 15 is connected to the SIE 12, the bulk buffer 13, and the IDE engine 14 to provide control over data conversion and connection between USB and IDE interfaces.

The IDE-to-SATA interface bridging unit 20 is connected to the USB-to-IDE interface bridging unit 10. The IDE-to-SATA interface bridging unit 20 provides conversion and connection between IDE and SATA interfaces, or between IDE and eSATA interfaces, or between SATA and eSATA interfaces, and, with the connection provided by the USB-to-IDE interface bridging unit 10, provides switching and conversion connection between USB and SATA interfaces or between USB and eSATA interfaces. The IDE-to-SATA interface bridging unit 20 can be of any type, such as a single chip or a circuit unit.

Figure 3:
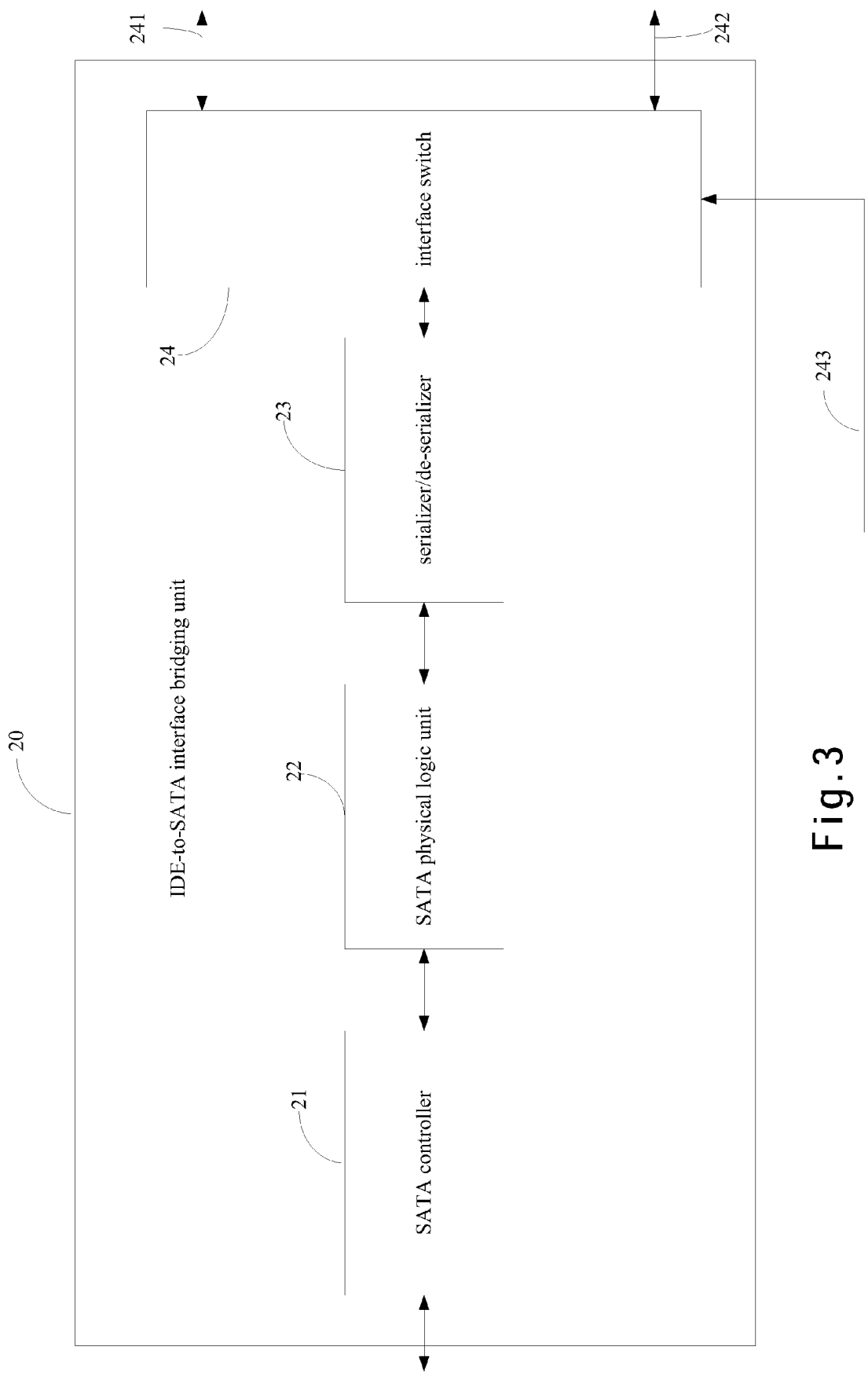
FIG. 3 shows a circuit block diagram of an IDE-to-SATA interface bridging unit of the multi-interface conversion device of the present invention.

Referring to FIG. 3, which shows an example of the IDE-to-SATA interface bridging unit 20, the IDE-to-SATA interface bridging unit 20 comprises a SATA controller 21, a SATA physical logic unit 22, a serializer/de-serializer (SERDES) 23, and an interface switch 24. The SATA controller 21 is connected to the IDE engine 14 of the USB-to-IDE interface bridging unit 10 to provide control over the data conversion and connection between the IDE and SATA or eSATA interfaces.

The SATA physical logic unit 22 is connected to the SATA controller 21 and supports 3.0 Gbps (bytes/second) and 1.5 Gbps physical data transmission and receiving of SATA or eSATA.

The SERDES 23 is connected to the SATA physical logic unit 22 and provides the functions of PLL and data transmission/receiving for conversion of parallel data into serial data in the process of data transmission, and conversion of serial data into parallel data in the process of data receiving.

The interface switch 24 is connected to the SERDES 23 and is provided with an SATA connection terminal 241, an eSATA connection terminal 242, and a control terminal 243 for external connection with an SATA interfaced device and an eSATA interfaced device. The interface switch 24 is switched in accordance with the status of the control terminal 243 to selectively provide connection between the SERDES 23 and SATA interface, or between the SERDES 23 and eSATA interface, or between the SATA connection terminal 241 and the eSATA connection terminal 242. In other words, the interface switch 24 can be switched to provide connection between IDE and SATA interfaces, or between IDE and eSATA interfaces, or between SATA and eSATA interfaces.

The IDE switching unit 30 has an IDE connection terminal 31 and an actuation terminal 32. The IDE connection terminal 31 provides an external connection with an IDE interfaced device. The IDE switching unit 30 is connected to the IDE engine 14 of the USB-to-IDE interface bridging unit 10 and the SATA controller 21 of the IDE-to-SATA interface bridging unit 20 whereby, based on the status of actuation at the actuation terminal 32, the IDE switching unit 30 selectively switches input/output IDE interface data of the USB-to-IDE interface bridging unit 10 or input/output IDE interface data of the IDE-to-SATA interface bridging unit 20 to the IDE connection terminal 31.

The switching logic unit 40 is connected to the control terminal 243 of the interface switch 24 of the IDE-to-SATA interface bridging unit 20 and the actuation terminal 32 of the IDE switching unit 30. The switching logic unit 40 outputs a switching control signal to the control terminal 243 and the actuation terminal 32 to cause the interface switch 24 and the IDE switching unit 30 to perform the above described switching operation so as to determine the switching and conversion connection among the USB interface, IDE interface, SATA interface and eSATA interface. In the first embodiment, the switching logic unit 40, which determines switching and conversion connection among all the interfaces, can be controlled by control software preloaded and stored in the device to automatically perform switching and conversion connection among all the interfaces.

Figure 4:
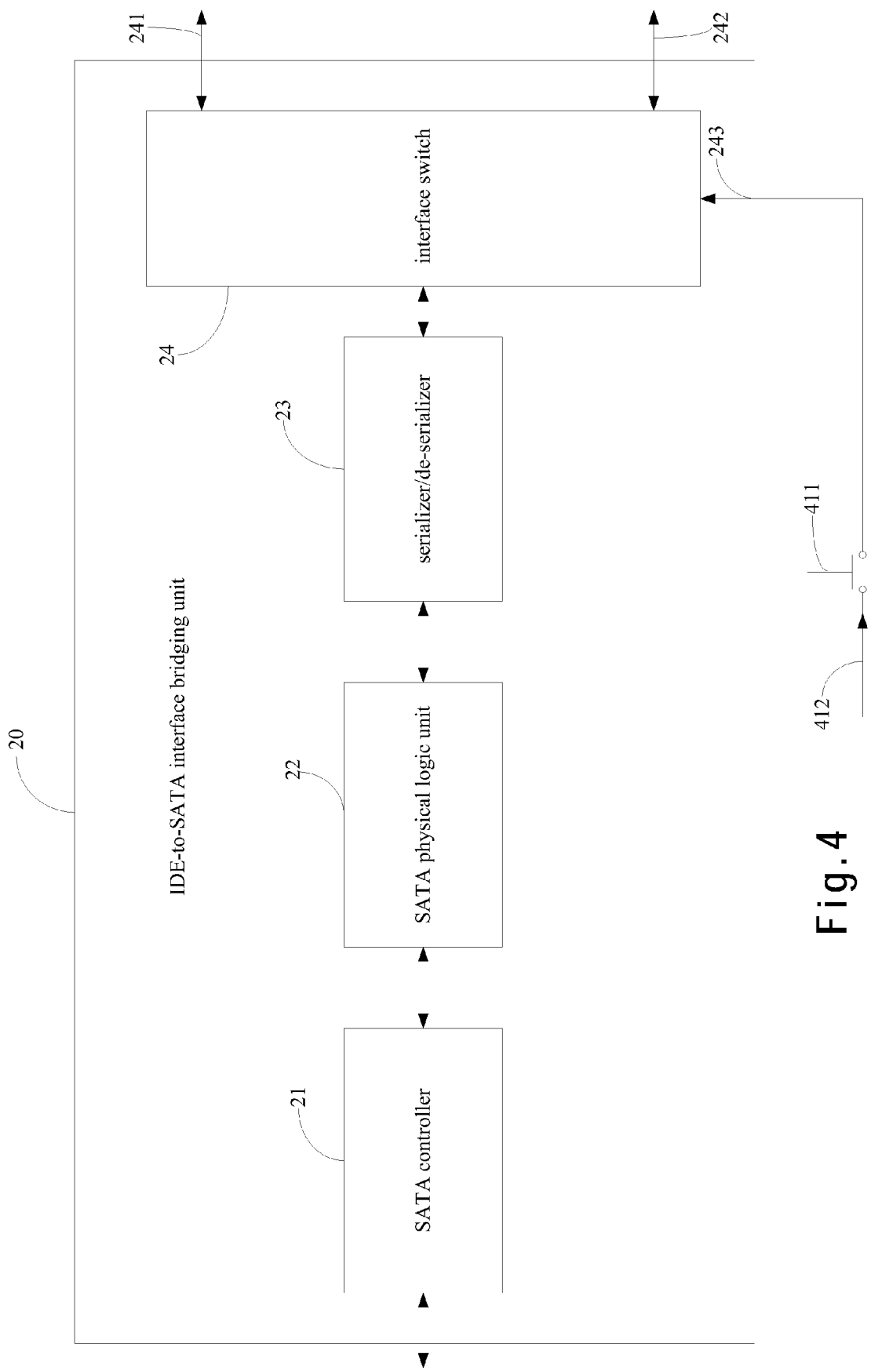
FIG. 4 shows a circuit block diagram of a multi-interface conversion device constructed in accordance with a second embodiment of the present invention.

Referring to FIG. 4, which shows a multi-interface conversion device constructed in accordance with a second embodiment of the present invention and also designated with reference numeral 100 for simplicity, in the multi-interface conversion device 100 of the second embodiment, the switching logic unit 40 comprises an actuation terminal 41, which provides external connection with an actuation switch 411. The actuation switch 411 provides an actuation signal 412 to the switching logic unit 40 to control the switching logic unit 40 to perform multi-interface switching and conversion connection among the USB interface, the IDE interface, and the eSATA interface. For example, a first actuation of the actuation switch 411 causes the switching logic unit 400 to carry out switching and conversion connection between USB to IDE interfaces; and a further actuation of the actuation switch 411 causes the switching logic unit 40 to switch and connect between USB and SATA interfaces and so on.

Figure 5:
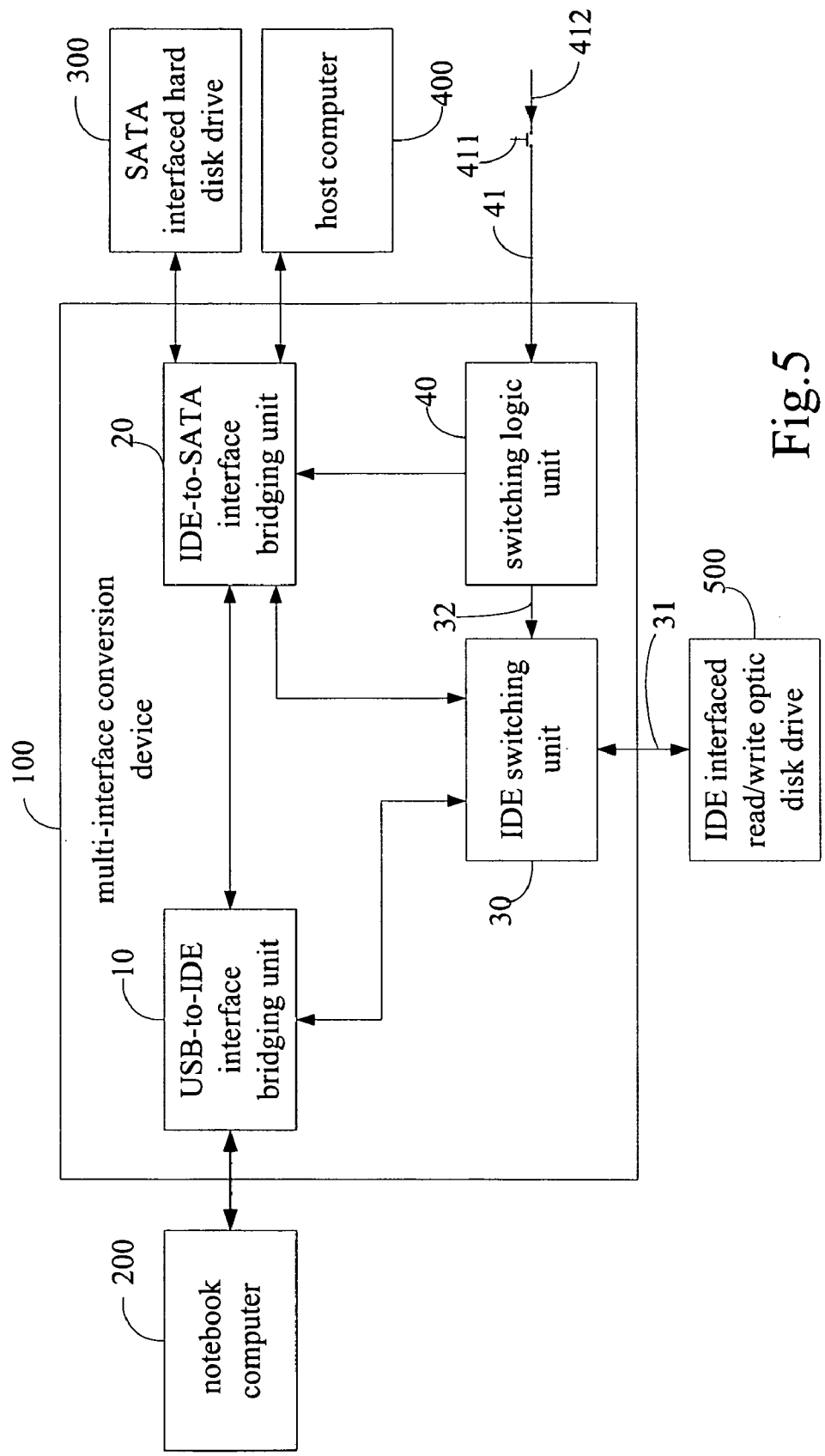
FIG. 5 shows a circuit block diagram of a first example of application of the multi-interface conversion device in accordance with the present invention.

Referring to FIG. 5, a first example of application of the multi-interface conversion device 100 is illustrated, in which the USB connection terminal 111 of the IDE interface bridging unit 10 is connected to a notebook computer 200. The SATA connection terminal 241 of the IDE-to-SATA interface bridging unit 20 is connected to an SATA interfaced hard disk drive 300; the eSATA connection terminal 242 is connected to a host computer 400; and the IDE connection terminal 31 of the IDE switching unit 30 is connected to an IDE interfaced read/write optic disk drive 500 whereby in accordance with the actuation of the actuation switch 411 of the switching logic unit 40, switching and conversion connection among electronic devices and data storage media of different interfaces, including the notebook computer 200, the SATA interfaced hard disk drive 300, the host computer 400, and the IDE interfaced read/write optic disk drive 500 can be performed.

Figure 6:
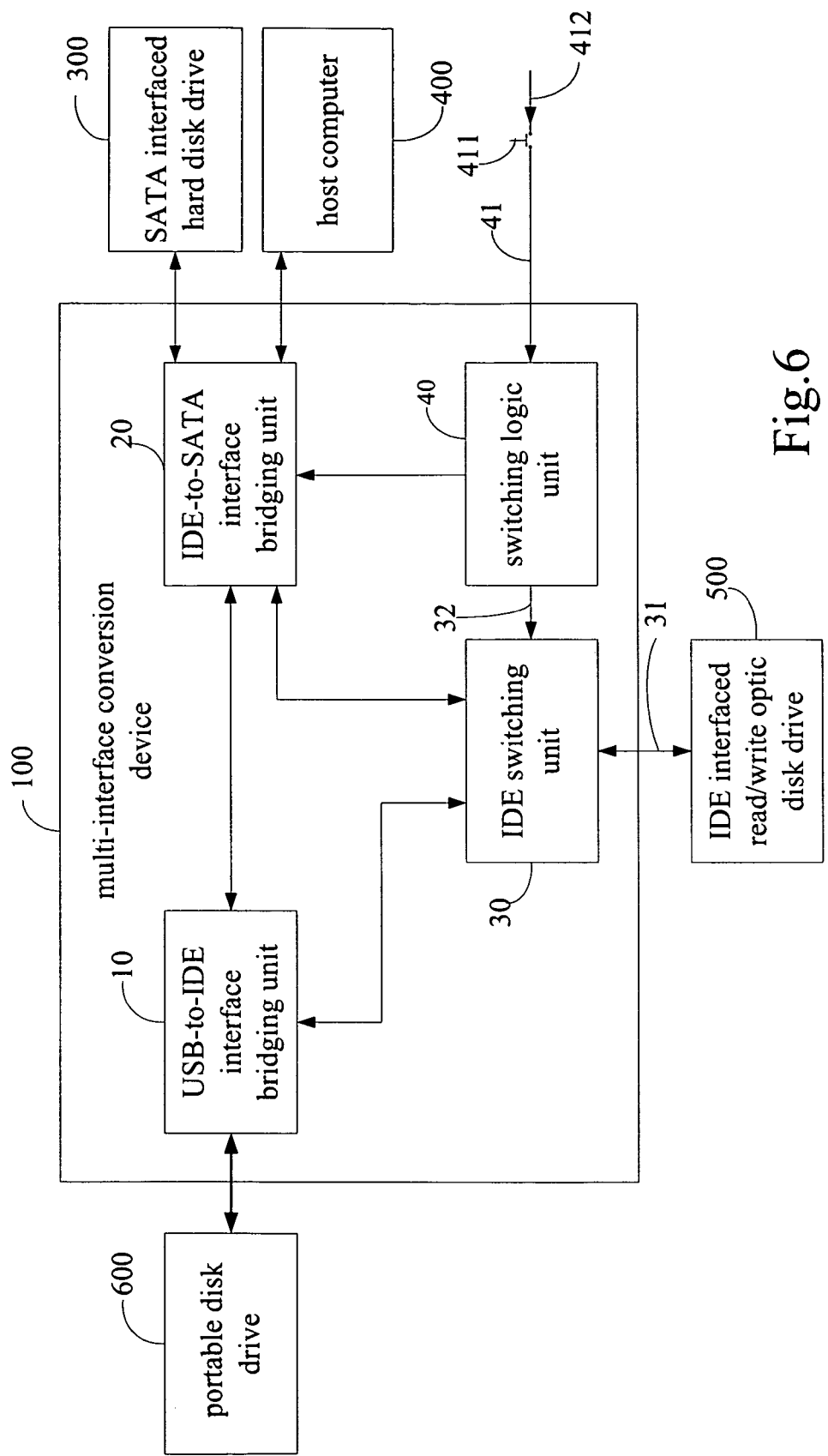
FIG. 6 shows a circuit block diagram of a second example of application of the multi-interface conversion device in accordance with the present invention.

Also referring to FIG. 6, a second example of application of the multi-interface conversion device 100 is illustrated, in which the USB-to-IDE interface bridging unit 10 is provided with USB OTG (On-The-Go) interface, which allows the USB connection terminal 111 to connect a portable disk drive 600. Again, the SATA connection terminal 241 of the IDE-to-SATA interface bridging unit 20 is connected to an SATA interfaced hard disk drive 300; the eSATA connection terminal 242 is connected to a host computer 400; and the IDE connection terminal 31 of the IDE switching unit 30 is connected to an IDE interfaced read/write optic disk drive 500 whereby in accordance with the actuation of the actuation switch 411 of the switching logic unit 40, switching and conversion connection among electronic devices and data storage media of different interfaces, including the portable disk drive 600, the SATA interfaced hard disk drive 300, the host computer 400, and the IDE interfaced read/write optic disk drive 500 can be performed.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A multi-interface conversion device, comprising:
   a USB-to-IDE interface bridging unit adapted to connect to a USB interfaced device, and providing bi-directional switching and conversion connection between USB interface and IDE interface;
   an IDE-to-SATA interface bridging unit connected to the USB-to-IDE interface bridging unit and adapted to connect to an SATA or eSATA interfaced device to selectively provide switching and conversion connection between USB and SATA interfaces, between SATA and eSATA interfaces, and selectively providing switching and conversion connection between IDE interface and SATA interface and between IDE interface and eSATA interface, the IDE-to-SATA interface bridging unit comprising:
      an SATA controller connected to the USB-to-IDE interface bridging unit to provide control over data conversion connection between the IDE interface and SATA or eSATA interface;
      an SATA physical logic unit connected to the SATA controller and supporting 3.0 Gbps and 1.5 Gbps physical data transmission and receiving of SATA or eSATA interface;
      a serializer/de-serializer (SERDES) connected to the SATA physical logic unit and having functions of PLL and data transmission/receiving for conversion of parallel data into serial data in a process of data transmission, and conversion of serial data into parallel data in a process of data receiving; and
      an interface switch connected to the SERDES and connectable to an SATA interfaced device and an eSATA interfaced host to selectively provide connection and switching between IDE interface and SATA interface, and between IDE interface and eSATA interface, and between SATA interface and eSATA interface;
   an IDE switching unit connected to the USB-to-IDE interface bridging unit, the IDE-to-SATA interface bridging unit, and an IDE interfaced device, to selectively provide switching and conversion connection between USB interface and IDE interface, between SATA interface and IDE interface, and between eSATA interface and IDE interface; and
   a switching logic unit connected to the IDE-to-SATA interface bridging unit and the IDE switching unit to control selection of switching and conversion connection between USB interface and IDE interface, between USB interface and SATA interface, between IDE interface and SATA interface, between IDE interface and eSATA interface, and between SATA interface and eSATA interface.

2. The multi-interface conversion device as claimed in claim 1, wherein the USB-to-IDE interface bridging unit comprises:
   a USB transceiver macrocell (UTM) providing connection with the USB interfaced device and transmitting and receiving a USB signal, the UTM being compatible to USB1.1 FULL SPEED and USB2.0 HIGH SPEED;
   a serial interface engine (SIE) connected to the UTM and processing and outputting USB data, signals and packets;
   a bulk buffer connected to the SIE to provide buffer for bi-directional data transmission between USB interface and IDE interface;
   an IDE engine connected to the bulk buffer and having a direct memory access (DMA) mode and an ultra DMA mode to serve as data input/output port with the IDE interface; and
   a microprocessor connected to the SIE, the bulk buffer, and the IDE engine to provide control over data conversion connection between USB and IDE interfaces.

3. The multi-interface conversion device as claimed in claim 2, wherein the UTM comprises a USB connection terminal.

4. The multi-interface conversion device as claimed in claim 1, wherein the interface switch has an SATA connection terminal and an eSATA connection terminal.

5. The multi-interface conversion device as claimed in claim 1, wherein the interface switch has a control terminal.

6. The multi-interface conversion device as claimed in claim 1, wherein the IDE switching unit has an IDE connection terminal.

7. The multi-interface conversion device as claimed in claim 1, wherein the IDE switching unit has an actuation terminal.

8. The multi-interface conversion device as claimed in claim 1, wherein the switching logic unit has an actuation switch.

9. The multi-interface conversion device as claimed in claim 8, wherein the actuation terminal is connected to an actuation switch.

* * * * *